Aug. 2, 1955     H. G. F. ROESSLER     2,714,347
SUPPORTING SYSTEM FOR PUSHING AGRICULTURAL
IMPLEMENTS BY MEANS OF A VEHICLE
Filed Jan. 31, 1952
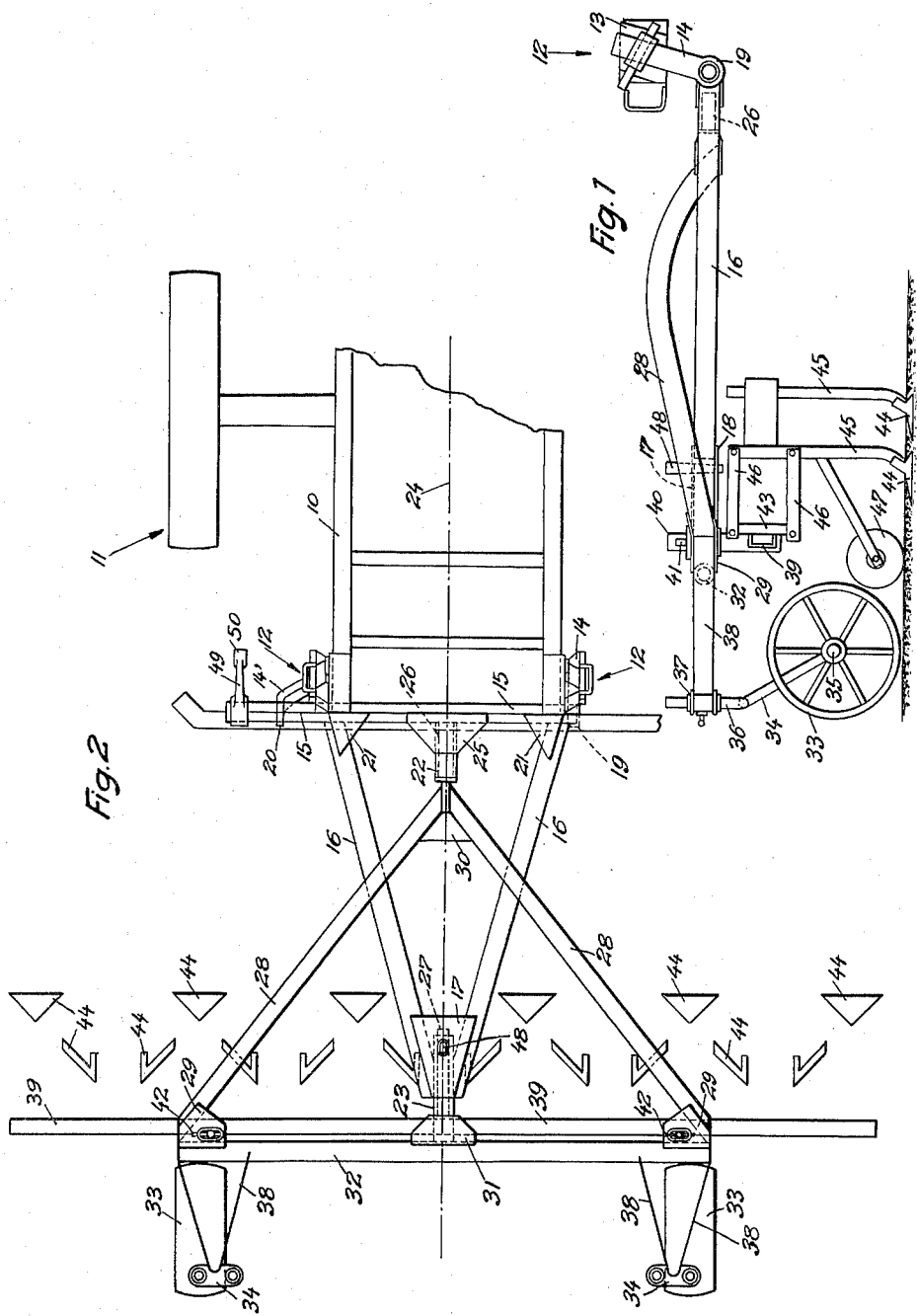
Inventor
Heinrich G.F. Roessler
By Hicke and Padlow
Attorneys

United States Patent Office 2,714,347
Patented Aug. 2, 1955

2,714,347

SUPPORTING SYSTEM FOR PUSHING AGRICULTURAL IMPLEMENTS BY MEANS OF A VEHICLE

Heinrich G. F. Roessler, Gaggenau, Germany, assignor to Daimler-Benz Aktiengesellschaft, Stuttgart-Unterturkheim, Germany Application January 31, 1952, Serial No. 269,220

3 Claims. (Cl. 97—47.22)

The present invention relates to a supporting system for pushing agricultural implements by means of a tractor or other vehicle and, more particularly, to a supporting frame adapted to carry the agricultural implement and provided with wheels and adapted to be coupled to and pushed by the vehicle.

It is an object of the present invention to provide a supporting system of such kind which is of high flexibility thereby permitting the agricultural implement to follow a course in conformity with the surface configuration of the land and will yet positively push the implement forward. Further objects of the present invention are to provide a supporting system of a rugged and simple structure which can be manufactured at a low cost and may be readily attached and detached from the tractor, and to afford a supporting system of the character described which may be readily lifted into an inoperative position for the purposes of transport.

Further objects of my invention will appear from a description of a preferred embodiment of the invention shown in the accompanying drawing. In the drawing, Fig. 1 illustrates an elevation of the supporting system and of a hoe attached thereto, and Fig. 2 is a plan view of the system shown in Fig. 1 in which the tractor and the hoe are diagrammatically shown.

The frame 10 of a tractor or other vehicle diagrammatically indicated in Fig. 1 at 11 is equipped with a pair of coupling devices shown at 12, each of which comprises a socket 13 fixed to the side face of frame 10 near the front thereof and a depending rod 14, or 14' respectively, detachably mounted in the socket 13 in fixed relationship thereto. A detailed description of such coupling device may be dispensed with herein, since it does not form part of the present invention. For a more detailed disclosure of the coupling device reference may be had to my co-pending application, Serial No. 269,219, filed January 31, 1952.

The coupling device serves the purpose of hingedly connecting the base of a triangular member to the vehicle, such member being formed by a rod 15 constituting such base and two struts 16 converging forwardly in an apex formed by two reinforcing sheet metal plates 17 and 18 welded to the struts 16.

For the purpose of establishing the hinged connection, the rod 14 is provided with an eye 19 at its lower end, while rod 14' is laterally offset, its end being formed with an eye 20. The base rod 15 extends through the eye 20 and terminates in the eye 19 being suitably held against axial displacement by suitable means, not shown. Hence, it will appear that the base rod 15 extends transversely of the vehicle 11 in front thereof, and that the triangular member 15, 16 may perform a rocking motion about the axis of the rod 15. The triangular member is further reinforced by sheet metal plates 21 welded to the rear corners thereof.

Moreover, the member 15 and the members 16 are provided with two co-axial spaced bearings formed by sleeves 22 and 23 respectively, the common axis of said sleeves extending at right angles to the rod 15 within the central vertical longitudinal plane 24 of the vehicle. The sleeve 22 is fixed to a bracket 25 welded to the central portion of rod 15 between the struts 16, whereas the sleeve 23 is located between the plate 17, 18 and suitably fixed thereto.

Both sleeves 22 and 23 are open at their front ends and are adapted to receive trunnions 26, 27 which are rearwardly projecting in cantilever fashion from a supporting frame to be described hereinafter.

The supporting frame has a triangular shape being formed by a transverse rod 32 and by a pair of struts 28 having their front ends attached to the rod 32 at spaced points by suitable reinforcing plates 29 welded thereto, and having their rear ends converging to an apex constituted by the trunnion 26 rigidly attached to the struts. At the apex the triangular supporting frame is reinforced by a sheet metal plate 30.

The central portion of rod 32 carries a bracket 31 to which the rearwardly projecting cantilever trunnion 27 is attached. Hence, it will appear that the triangular member 15, 16 constitutes means for mounting the supporting frame 28, 32 in front of the vehicle 11 guiding such frame for both a vertical motion relative to the vehicle and a rocking motion substantially about the longitudinal axis of the vehicle.

Preferably, the supporting frame is provided with one or more wheels adapted to travel on the ground. In the embodiment shown, a pair of such supporting wheels 33 is provided, each wheel being carried by an offset arm 34 which extends from the wheel axle 35 laterally forwardly and upwardly and terminates in a vertical pin 36 which is adjustably fixed within a socket 37 attached to a sheet metal bracket 38 which is fixed to and extends forwardly from the end of rod 32 of the supporting frame.

The supporting frame carries an agricultural implement which, in the present embodiment, is a hoe but may be a plow or any other agricultural implement. For this purpose, a channel bar 39 has rigidly attached two spaced posts 40 having vertical slots 41. The posts extend through vertical bores provided in brackets 29 and wedges 42 inserted in and extending through the slots 41 bear upon the brackets 29.

The hoe is fixed to suitable brackets 43 attached to the channel bar 39 by suitable means not shown. In the present embodiment the hoe is composed of a plurality of blades 44 carried by stems 45 guided by parallel links 46 for upward and downward motion, such links being pivotally connected to the brackets 43. Each stem is suitably guided by a wheel 47 in a manner well known in the art. The elements 46 and 47 have been omitted in Fig. 2 in favor of a clearer illustration of the supporting means.

The struts 28, which carry the trunnion 26, are so curved as to overlie the struts 16 at a suitable distance therefrom, thereby permitting the supporting frame to rock about the common axis of the bearings 22 and 23.

Detachable means are provided to secure the trunnions 26 and 27 in positions within the sleeves 22 and 23. Such detachable means may be formed by a wedge 48 tapering downwardly, such wedge being inserted into aligned apertures provided in the sleeve 23 and in the trunnion 27, whereby wedge 48 is securely seated in the aperture provided in the trunnion 27 while it is seated with some play in the aperture provided in sleeve 23, as shown in Figure 2 of the drawing which shows the slight amount of play between wedge 48 and the aperture and sleeve 23.

It will be noted that the pivotal axis of member 15, 16 formed by the base rod 15 is positioned at a higher level than the axis 35 of the supporting wheels, and that the agricultural implement is carried by the supporting frame 28, 32, 39 behind the wheels and in front of the horizontal pivotal axis of member 15, 16. This will have the effect of producing a downward thrust holding the wheels in firm engagement with the ground thus affording a reliable guidance for the agricultural implement.

Upon removal of the wedge 48, the supporting frame 28, 32 and the beam 39 attached thereto may be pulled forwardly off the supporting member 15, 16 whereupon the latter may be swung upwardly into the inoperative position. For the purpose of transport, the detached supporting frame may be loaded on the vehicle lengthwise thereof in a position in which the bar 39 will not act as an obstruction. This is particularly important for such agricultural implements as require a supporting beam 39 of great length.

It is also possible, however, to leave the supporting frame mounted on the member 15, 16 when the same is rocked upwardly into inoperative position.

In order to perform such rocking operation, suitable power-driven means may be provided, such as arm 49 fixed to the end of rod 15 and provided with an eye 50 adapted to be connected by a link to a suitable mechanical, pneumatic, fluid-operated, or electrical source of power, whereby the rockable member 15, 16 and the supporting frame with the agricultural implement mounted thereon may be swung into inoperative position.

It will be appreciated that because of the guidance of the frame 28, 32, 39 for both a vertical motion relative to the vehicle and a rocking motion about the axis of bearings 22 and 23, the agricultural implement will be reliably guided in a path conforming to the configuration of the land. Moreover, it will be appreciated that the agricultural implement may be readily exchanged upon removal of the wedges 42, and that the transporation of the implement may be readily handled, even on narrow roads.

While I have described a preferred embodiment of my invention, I wish it to be clearly understood that the same is not limited to the details thereof, but is capable of numerous modifications within the scope of the appended claims.

What I claim is:

1. The combination comprising a motor vehicle, a substantially triangular supporting frame, an agricultural implement carried by said supporting frame, the base of said triangular frame extending transversely of said vehicle in front thereof, a pair of wheels mounted on said supporting frame, a triangular member having its base hinged to said vehicle in front thereof to be rockable about a transverse horizontal axis, means for mounting the apex of said triangular frame on the base of said triangular member for rocking motion about the centerline of the latter extending at a right angle to said transverse axis, and means for mounting the apex of said triangular member on the base of said triangular frame for rocking motion about said centerline.

2. The combination comprising a motor vehicle, a triangular member having a base and an apex, said base being hinged to the front of said vehicle for rocking motion of said member about a transverse horizontal axis, said member being provided with two spaced bearings having a common axis extending substantially at a right angle to said transverse horizontal axis, one bearing being located at said apex and the other bearing being located on said base, a supporting frame provided with two co-axial trunnions journalled in said bearings, wheels mounted on said frame, and an agricultural implement carried by said frame beneath said member, said frame including struts carrying one of said trunnions and being curved to normally overlie said triangular member at a distance therefrom.

3. The combination claimed in claim 2, in which power-driven means are provided for rocking said supporting frame upwardly into inoperative position.

References Cited in the file of this patent

UNITED STATES PATENTS

| | | |
|---|---|---|
| 1,298,989 | Mason | Apr. 1, 1919 |
| 1,353,992 | Ferris | Sept. 28, 1920 |
| 1,556,508 | Hentzell et al. | Oct. 6, 1925 |
| 1,653,118 | Pellette | Dec. 20, 1927 |
| 2,532,580 | Tom | Dec. 5, 1950 |
| 2,596,641 | Bert et al. | May 13, 1952 |
| 2,602,389 | Markel | July 8, 1952 |